US007079993B2

(12) United States Patent
Stephenson et al.

(10) Patent No.: US 7,079,993 B2
(45) Date of Patent: Jul. 18, 2006

(54) AUTOMATED GENERATOR OF OPTIMAL MODELS FOR THE STATISTICAL ANALYSIS OF DATA

(75) Inventors: David Mark Stephenson, West Chester, PA (US); William Reynolds Monach, Grafton, VA (US)

(73) Assignee: Daniel H. Wagner Associates, Inc., Malvern, PA (US)

( * ) Notice: Subject to any disclaimer, the term of this patent is extended or adjusted under 35 U.S.C. 154(b) by 262 days.

(21) Appl. No.: 10/424,878

(22) Filed: Apr. 29, 2003

(65) Prior Publication Data

US 2004/0220784 A1 Nov. 4, 2004

(51) Int. Cl.
*G06F 17/50* (2006.01)

(52) U.S. Cl. ............................... 703/2; 703/13; 702/19; 702/179

(58) Field of Classification Search .................... 703/2, 703/13; 702/19, 179; 717/109
See application file for complete search history.

(56) References Cited

U.S. PATENT DOCUMENTS

2002/0111742 A1* 8/2002 Rocke et al. ................. 702/19
2003/0176931 A1* 9/2003 Pednault et al. .............. 700/31
2004/0083452 A1* 4/2004 Minor et al. ................ 717/109
2004/0172267 A1* 9/2004 Patel et al. ..................... 705/1
2004/0193451 A1* 9/2004 McNair ......................... 705/2

* cited by examiner

*Primary Examiner*—Thai Phan
(74) *Attorney, Agent, or Firm*—George F. Helfrich

(57) ABSTRACT

Provided is an automated process for producing accurate statistical models from sample data tables. The process solves for optimal parameters of each statistical model considered, computes test statistics and degrees of freedom in the model, and uses these test statistics and degrees of freedom to establish a complete ordering of the statistical models. In cases where the sample data table is sufficiently small, the process constructs and analyzes all reasonable statistical models that might fit the data table provided. In cases where the number of possible models is prohibitively high, the process begins by constructing and solving more general models and then constructs and solves those more detailed models that are similar to those general models that achieved the highest ordering. In either of these two cases, the process arrives at a statistical model that is highest in the ordering and is thus deemed most suitable to model the sample data table.

6 Claims, 2 Drawing Sheets

AUTOMATED GENERATOR OF OPTIMAL MODELS FOR THE STATISTICAL ANALYSIS OF DATA

STATEMENT REGARDING FEDERALLY SPONSORED RESEARCH OR DEVELOPMENT

The U.S. Government has a paid-up license in this invention as provided for by the terms of contract numbers N00014-99-M-0031 and N00014-99-C-0424 awarded by the Office of Naval Research.

BACKGROUND OF THE INVENTION

1. Technical Field of the Invention

This invention relates generally to statistical modeling and analysis. This invention relates specifically to the automated process of building, analyzing and creating a hierarchy of statistical models fit to a test data set.

2. Description of the Related Art

There has been a longstanding need for a method which would provide automated statistical analysis employable in a wide variety of applications, including detailed analysis of initial data mining results. The method would produce answers to several key questions, such as a. How different factors affect the probability of a given event;

b. Which factors are most influential in determining the probability of a given event or the number of occurrences of a given event; and c. How different factors affect the average number of occurrences of a specific event.

Examples of these questions are:

How do race, age, and gender affect the probability that a person will suffer a heart attack before age 40? What is the probability for a particular profile?

How do age range, gender, education level, and work experience affect the probability that a person's income will fall into a particular salary range? What is the most determining factor for women in particular?

How many traffic accidents (per 5 year period) should we expect from a specific category of insured drivers? Which factor most heavily affects the expected number of accidents?

There are countless situations in which businesses and researches need answers to these or similar questions. In general, they have available only limited sample data to estimate the desired probabilities or average number of events. Unless generated using a large number of test cases, these sample statistics tend to reflect anomalies in the data rather than true probability trends.

SUMMARY OF THE INVENTION

It is accordingly a primary object of the present invention to provide what is not available in the art.

Provided is an automated process for producing accurate statistical models to fit sample data tables. The process constructs and analyzes all reasonable statistical models that fit the sample data table provided, solves for the optimal parameters of the statistical models, and computes test statistics to check the fit of each model with the sample data table. The process uses these test statistics, combined with information about the degrees of freedom in the model, to compute a model score that allows the process to generate a complete ordering of the statistical models analyzed and to present a model that is deemed to be most suitable to the sample data table. In cases where the number of possible statistical models is prohibitively high, the process begins by constructing and solving more general models and then constructs and solves those more detailed models that are similar to those general models which are highest in the generated ordering. The process then presents the model with the highest ordering, as well as a set of average table values corresponding to the statistical model, including average values for table entries that were lacking initial information.

Another embodiment of the present invention additionally includes an automation of modeling using general linear models, where the only required inputs are the sample data table and, in the case of logistic modeling, an indication of which variable is to be considered as the response variable.

Another embodiment of the present invention additionally includes specifying which covariates must interact in the model, specifying which covariates are considered to be ordinal and specifying at what stage(s) of the process ordinal models should be considered.

Another embodiment of the present invention additionally includes automatically constructing and solving for the optimal parameters of all possible hierarchical nominal or ordinal models.

Another embodiment of the present invention additionally includes automatically determining model test statistics and residual degrees of freedom for each statistical model and using these test statistics and degrees of freedom to establish a complete ordering of statistical models.

Another embodiment of the present invention additionally includes specifying that a heuristic, rather than exhaustive, exploration of statistical models be performed on the nominal models, or on the nominal and ordinal models, or on the ordinal models only This invention finds application in the area of credit scoring, where covariates such as age, profession, gender, and credit history are used to determine the likelihood that an individual will default on a loan. It also finds application in analyzing the effectiveness of many types of tools as they are used in various environments (e.g., the effectiveness of radar when used in different weather conditions). It also finds application in the area of insurance, where one wishes to estimate the future number of claims against a specific insurance policy based on a database of past insurance claims.

BRIEF DESCRIPTION OF THE DRAWINGS

For a more complete understanding of the present invention, including its primary object and attending benefits, reference should be made to the Detailed Description of the Invention, which is set forth below. This Detailed Description should be read together with the accompanying drawings, wherein.

DETAILED DESCRIPTION OF THE INVENTION

Figure 1:
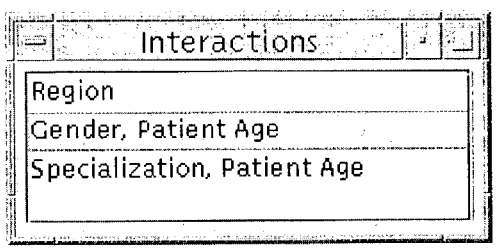
FIG. 1 is a display showing groups of factors which interact in a model according to the present invention.

The present invention employs discrete category regression methods similar to linear regression methods. Both categorical and linear regression methods fall into a general category known as General Linear Models. The models dealing with categorical data are more advanced than those dealing with linear data, using more sophisticated modeling and requiring more computationally intensive approaches.

The statistical and numerical tools required for analysis of General Linear Models are not at all straightforward. Even advanced statistical software, while taking away some of the burden of computation, still requires the user to form and interpret individual models. In addition, the number of models to choose from grows exponentially in the number of factors that are considered.

The present invention completely automates the process of constructing, analyzing and comparing statistical models fit to a sample data set. Once the user has entered the sample data, the invention does all of the work, forming and solving tens, hundreds, or thousands of possible statistical models and determining the quality of each model. The user can view a ranking of which factors are scored as being most important and can view a variety of graphs showing how different factors affect the overall outcome. The user can also view the results in a variety of display formats.

Illustration

To illustrate how our method can answer two example questions, consider the following scenario:

A pharmaceutical company is studying the distribution of a certain drug. The company has enlisted the help of a sample group of physicians to determine the average number of prescriptions written based on the following list of factors: patient gender, patient age bracket, physician specialization, and geographic region within the country.

The different factors were broken down as shown in the following Table 1:

TABLE 1

Factors affecting number of prescriptions written

| Geographic Region | Patient Gender | Specialization | Patient Age Bracket |
|---|---|---|---|
| Northeast | Male | Pediatrics | 0–11 |
| Mid-Atlantic | Female | General | 12–18 |
| South | | Internal Medicine | 19–35 |
| Southwest | | Geriatrics | 36–65 |
| Midwest | | | 65+ |
| Northwest | | | |
| Pacific | | | |

Each physician reported the number of prescriptions written to patients in each category during the test period and the results were combined into a sample table. Our process started with this sample table and recommended a best statistical model, giving information about which factors are most important in determining how many prescriptions will be written, which groups of factors seem to operate together and which seem to operate independently, and what the true average number of prescriptions for each category seems to be.

In constructing this illustration, we simulated our test data by taking a random sample from a predetermined distribution. Thus, we have the "true average" number of responses for each combination of factors. We use this simulated data set as the measured data. We can compare both the sample and modeled data sets to this "true average," giving us an idea of the benefits of using the modeled data as opposed to the sample data.

In this particular example, we must choose from among 166 possible nominal and 66,558 possible ordinal models. Our method can automatically generate and analyze all of these models, or we can ask for a quicker, heuristic search, in which case the method efficiently searches the space of all possible models to arrive at a "best" model. We can then display the groups of factors that interact in the resulting model. See FIG. 1.

From FIG. 1, we see that we can consider region independently, but that gender and patient age should be viewed together, as should physician specialization and patient age. In other words, we could well make a statement such as "More prescriptions tend to be given in the Southwest than in the Midwest." Such a statement could be made without specifying a gender, age bracket or physician type. However, we could not say, "More prescriptions tend to be given to males than to females" unless we also include more detailed information about age, such as, "For patients over the age of 65, more prescriptions tend to be given to males than to females."

Figure 2:
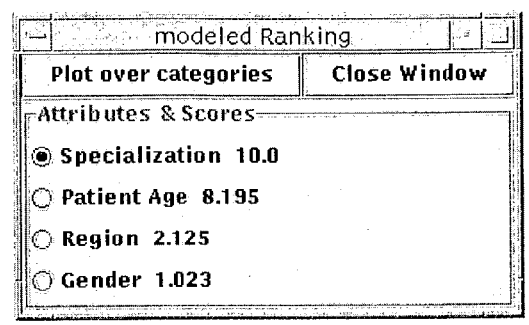
FIG. 2 is a menu displaying influential factors in the model output.

We can get an idea of which of the four factors is most influential in the model output by our method by ranking the factor effects. The result is the menu displayed in FIG. 2.

Figure 3:
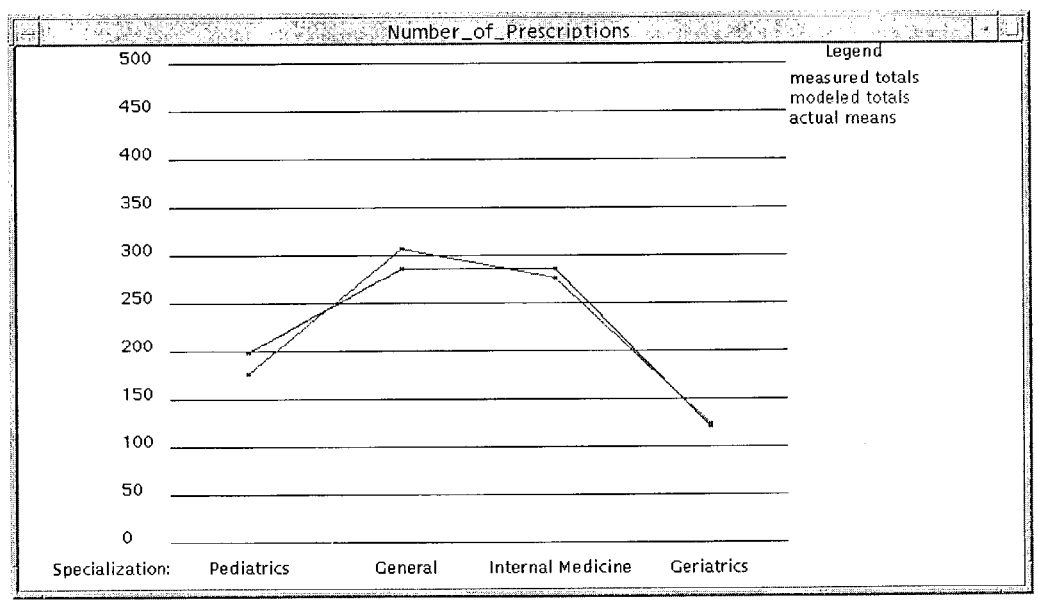
FIG. 3 is a plot showing the number of all prescriptions written as a function of physician specialization in an example presented according to the present invention.

We can proceed to view the total number of prescriptions as a function of specialization. See FIG. 3.

Note that the measured (sample) data and the modeled data agree. The other curve is the actual mean number of responses which were used to form the distribution of the sample data. In the aggregate data, summed over all ages and regions and genders, there is very little difference between the sample, modeled, and true curves. This is to be expected, since anomalies in the random data get smoothed out over large data samples. This changes when we look at a specific response category, and the benefits of using well-modeled data become more evident.

We proceed to analyze the data in more detail. The graphs in FIG. 4 show the number of prescriptions written for one specific group: males between the ages of 19 and 35, living in the Southwest.

Figure 4:
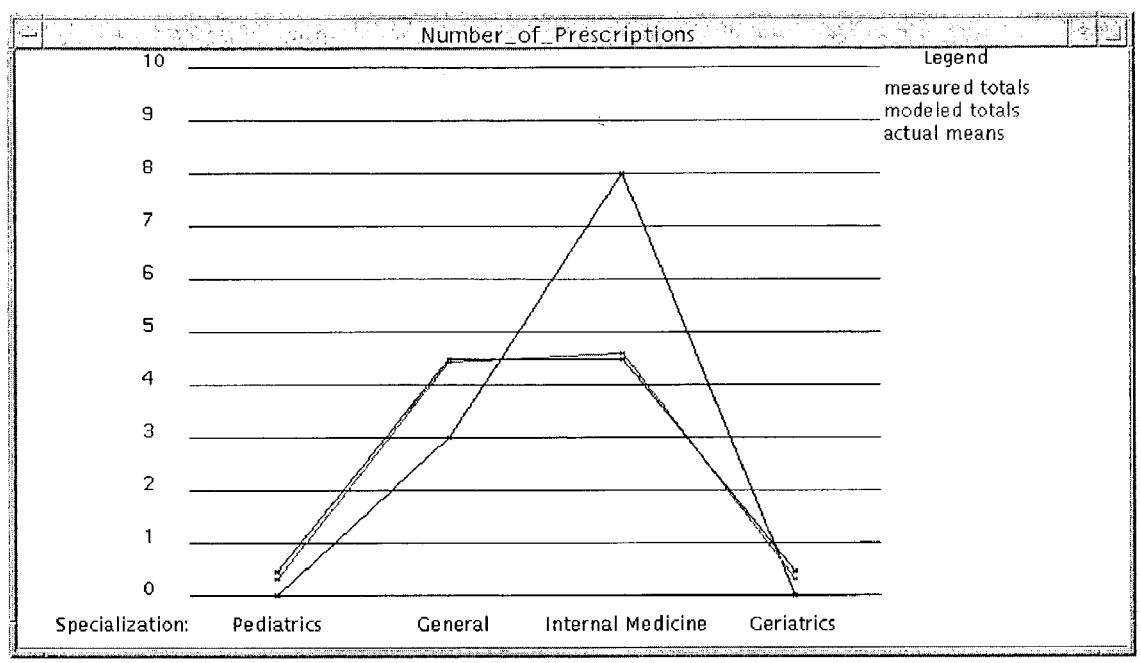
FIG. 4 is a plot showing the number of prescriptions written for males aged 19–35 in the Southwest as a function of physician specialization in the example of FIG. 3.

The jagged measured data curve in FIG. 4 bears the marks of the variance of the distribution, but the modeled curve matches the true mean number of prescriptions almost exactly. It is at this level of detail that we most clearly see the advantages of using the generated "best" statistical model to analyze sample data, rather than simply analyzing the sample data directly.

Those familiar with Linear Regression will recall how a statistical model can be used to smooth out raw data and determine trends. Linear Regression, however, requires both continuity and ordering in the variables studied. Categorical Data Analysis is used with data which falls into distinct categories. In this analysis, we work with two types of statistical models, each answering a different question about the data studied.

Logistic Regression Models

In Logistic Regression Models, the dependent variable follows a multinomial distribution (J possible responses) with probabilities determined by the independent variables. Define $\pi_j(x_i)$ as the probability of an event in the i'th scenario falling into the j'th response category (each scenario consists of a different combination of categories of the independent variables). The logistic regression model is $$\pi_j(x_i) = \frac{e^{g_j(x_i)}}{1 + \sum_{k=1}^{J} e^{g_k(x_i)}},$$

where $g_j(x_i)$ is a function which depends on the details of the model (more on this later) and $g_0(x_i)=0$. Note that we can recover $g(x)$ using the logit transformation, defined as $$g_j(x_i) = \ln\left(\frac{\pi_j(x_i)}{\pi_0(x_i)}\right).$$

Once we have determined the interactions in the model, we need to determine a set of model parameters. These are constants that determine how heavily each factor or combination of factors is weighed. These parameters contribute to the calculation of $g_j(x_i)$ and thus to the value of $\pi_j(x_i)$. There is a set of parameters corresponding to each $g_j(x_i)$ (j>0).

For fixed j, several scenarios will share some of the model parameters (such as the constant term). The Newton-Raphson method is used to determine which parameters $\beta$ maximize the likelihood function $$l(\vec{\beta}) = \prod_{i=1}^{n} \prod_{j=0}^{J} \pi_j(x_i)^{y_{i,j}}.$$

Here $y_{i,j}$ is the number of occurrences of the j'th event in the i'th scenario in the raw data.

Loglinear Models

Loglinear Models estimate the number of events that occur given a combination of factors. Let $n_i$ denote the number of recorded events in the i'th scenario. The number of events in each scenario is modeled as a Poisson distribution with mean $m_i$, where $\log m_i = g(x_i)$.

Again, Newton-Raphson is used to maximize the likelihood function. Ignoring constants and taking the logarithm, it is equivalent to maximize the function $$L(\vec{m}) = \sum_{i} [n_i \log(m_i) - m_i].$$

Model Building

We now go into more detail about the function $g(x)$ (or $g_j(x)$). For both logistic regression and loglinear modeling, there is a corresonding design matrix X, which gives a linear transformation on the parameters used in the model. Each row of X contains the multipliers for the parameters to indicate how they are used in each particular scenario. These multipliers are 0 or 1 for nominal models and 0 or a scaling constant for ordinal models. The height of X is the number of scenarios and the width is the number of parameters in the model.

We now define $g(x_i)$:

$$g(x_i) = \sum_{j=0}^{k} \beta_j x_{ij},$$

where k is the number of parameters in the model. The term $g_j(x)$ is defined in the same way, except that the sum is only over those parameters which correspond to the j'th response. If the width of X were split evenly into J-1 rows, each group of columns would be identical to the others, and $g_j(x)$ would be defined using the product of the j'th group with the corresponding $\beta$ terms.

We have a wide variety of models to choose from, depending on which factors and which combination of factors we incorporate into the model.

The linear function $g(x)$ has the general form:

$g(x) =$ constant term + term depending on which category of the factor we are considering (for each factor included in the model) + term depending on which combination of the 2 factors we are considering (for each 2-factor interaction term in the model) + term depending on which combination of the 3 factors we are considering (for each 3-factor interaction term in the model) ...

etc.

The parameters $\beta$ correspond to the terms added above. Suppose, for example, that factor X has three categories, factor Y has four categories, and that XY interaction is included in the model. For a particular scenario, we would compute $g(x)$ as follows:

$g(x) =$ constant + term corresponding to X category (3 possibilities) + term corresponding to Y category (4 possibilities) + term corresponding to XY combination (12 possibilities) + any other terms in the model

We only consider hierarchical models, requiring that any model that includes an n-factor interaction term also include the (n−1)-factor terms from which it is built. So, for example, a model with XYZ interaction must also have XY, XZ and YZ interactions. Parameters satisfy zero-sum constraints at each interaction. In the example above, once we have determined two of the possible X category parameters, then the third must be the negative of the sum of the other two. Likewise the first eleven of the XY interaction parameters determine the last parameter.

A variable may be considered to be ordinal if its categories have a natural ordering. It is considered to be nominal if the model does not regard its categories as ordered. Taking ordering into account can help smooth the model without the addition of unnecessary parameters. We may use models where variables are considered to be ordinal or strictly nominal. We can also use models where variables behave as ordinals in some interactions and as nominals in others.

Model Assessment

Each statistical model has a test statistic which is asymptotically Chi-squared if the model truly reflects the distribution of the data. The degree of freedom of the Chi-squared test statistic is equal to the residual degrees of freedom (rdf) of the model. The rdf of the model is defined as the difference between the number of scenarios and the number of free parameters in the model (not counting those determined by the zero-sum constraints). In other words, the rdf is the 'free play' left in the model. If we had one parameter per scenario, we would exactly fit the model to the empirical data. Checking the statistic value against the corresponding Chi-squared table gives us an idea of whether the model is a reasonable fit for the data.

Logistic Regression

The test statistic we use for Logistic Regression is defined as $X^2 = \Sigma_i e_i^2$, where $$e_i = \frac{y_i - n_i \hat{\pi}_i}{(n_i \hat{\pi}_i (1 - \hat{\pi}_i))^{\frac{1}{2}}}.$$

If there are more than two possible outcomes in the Logistic Regression model, we must modify the test statistic to assure that the $e_i$ terms are still normally distributed. Let $n_{i,j}$ denote the number of outcomes j in the i'th scenario. If we have only one random event, then $Var(n_{i,j}) = p_{i,j}(1 - p_{i,j})$ and $Cov(n_{i,j}, n_{j,k}) = -P_{i,j} p_{j,k}$. If $n_i$ is the vector $(n_{i,1}, \ldots n_{i,r})$ (note that the first response is not included), $p_i$ is the vector $(p_{i,1}, \ldots p_{i,r})$ and $N_i$ is the total number of responses for scenario i, then $(n_i - N_i p_i)/\sqrt{N_i}$ converges to a multidimensional normal distribution, $N(0, \Sigma)$, where $\Sigma = diag(p_j) - (p_i p_j)_{ij}$ is the covariance matrix of the multinomial distribution as described above.

Note that if $Y \sim N(0, \Sigma)$ then $MY \sim N(0, M\Sigma M')$. We diagonalize the matrix $\Sigma = VDV'$, and then we get $V'Y \sim N(0,D)$. The term corresponding to each scenario is then $(V'Y)_i / \sqrt{(D_{ii})} \sim N(0,1)$. We add the square of each of these terms to get a Chi Squared distribution. A formal proof of the actual number of degrees of freedom has yet to be completed, but we estimate this number as (Number of scenarios)*(Number of response categories−1)−(Number of model parameters). Recall that the probability assigned to the first response category of any scenario is determined by the remaining probabilities in that scenario, and thus we disregard it for all computational purposes.

Loglinear Modeling

There are a variety of statistics available for Loglinear Modeling, but we use a general statistic, developed by Cressie and Read.

$$X^2 = \frac{2}{\lambda(\lambda+1)} \sum n_i \left( \left( \frac{n_i}{m_i} \right)^\lambda - 1 \right) \quad (-\infty < \lambda < \infty).$$

Recall that the $n_i$ are the empirical counts and the $m_j$ are the modeled counts. This statistic generalizes other statistics in that it is equal to the Pearson statistic when $\lambda = 1$ and approaches the likelihood-ratio statistic as $\lambda$ approaches zero. We have chosen to use $\lambda = \frac{2}{3}$, a value which Cressie and Read recommend to reduce the effects of sparseness in the empirical data.

Model Selection and Heuristics

Although methods exist for making comparisons between different models, it is not clear how to select the 'best' of all possible models. In fact, it is only the surge in computational power that makes it feasible to compare as many models as we do. Our method chooses the model which maximizes the score p*rdf, where p refers to the right probability tail of the Chi-squared statistic for the model. In this way, we prefer models that seem to fit the data well without over-fitting.

Because the number of possible models grows exponentially in the number of factors, we use several heuristics to arrive at near-optimal solutions.

The heuristic for selecting a near-optimal model with strictly nominal interactions is as follows. If there are n factors, we start with the model with all (n−1)-way interactions. We record the score and compare it to the score with all (n−2)-way interactions. This shrinking process continues until the models stop improving after the m-way interaction model. We return to the model with all m-way interactions and add the (m+1)-way variable which most improves the model's score. We keep adding (m+1)-way variables so long as the model keeps improving. We then return to the model with all m-way interactions and delete the m-way variable whose deletion results in the greatest improvement in score. We continue to delete m-way variables so long as the models improve. We conclude by choosing the best of all models analyzed in this process.

Once we have chosen a nominal model, we may begin to add ordinal interactions. The heuristic used is to give ordinal interaction to one factor in one variable at the highest level of interaction used in the model. The factor and variable are chosen so as to maximize improvement. We repeat this process so long as the models improve. When improvement stops, we perform the same algorithm one level down, but only allow those ordinal interactions which are preserved at the higher level variables which are built from the variable in question.

What is claimed is:

1. A process for producing, from sample data tables, an accurate statistical model, including choice of significant covariates and correlations between model covariates, the process comprising:
    a. providing a sample data table listing either (a) the recorded occurrences of one of two or more possible events, (b) the recorded number of occurrences of a possible event, and (c) the recorded measurements of a set of variables;
    b. generating statistical models fitting the sample data table;
    c. solving for optimal parameters of each statistical model considered;
    d. using model test statistics and the number of degrees of freedom in each model to assess the suitability of models, to arrive at a complete ordering of the models, and to determine which additional models to build, solve, and test;
    e. providing a statistical model that has the highest observed ordering, and thus most closely fits the sample data table;
    f. providing average table values, including the possibility of values in table entries where no sample data occurred, based on that model that attained the highest ordering when fit to the sample data table.

2. The process according to claim 1, additionally comprising: automating modeling and analysis of data using general linear statistical models, the only required inputs being the sample data table and, in the case of logistic modeling, an indication of which variable is to be considered as the response variable.

3. The process according to claim 1, additionally comprising: specifying which covariates must interact in the models and which covariates are considered to be ordinal, and then specifying at which stage of the process ordinal models should be considered.

4. The process according to claim 1, additionally comprising: automatically constructing and solving for the optimal model parameters of all possible hierarchical nominal and ordinal models.

5. The process according to claim 4, additionally comprising: automatically determining model test statistics and degrees of freedom for each model and using said test statistics and degrees of freedom to generate a complete ordering of the statistical models, whereby any model may be compared against any other model.

6. The process according to claim 4, additionally comprising: specifying that a heuristic, rather than exhaustive, exploration of possible statistical models be performed on the nominal models, on the nominal and ordinal models, or on the ordinal models only.

* * * * *